United States Patent Office 3,482,280
Patented Dec. 9, 1969

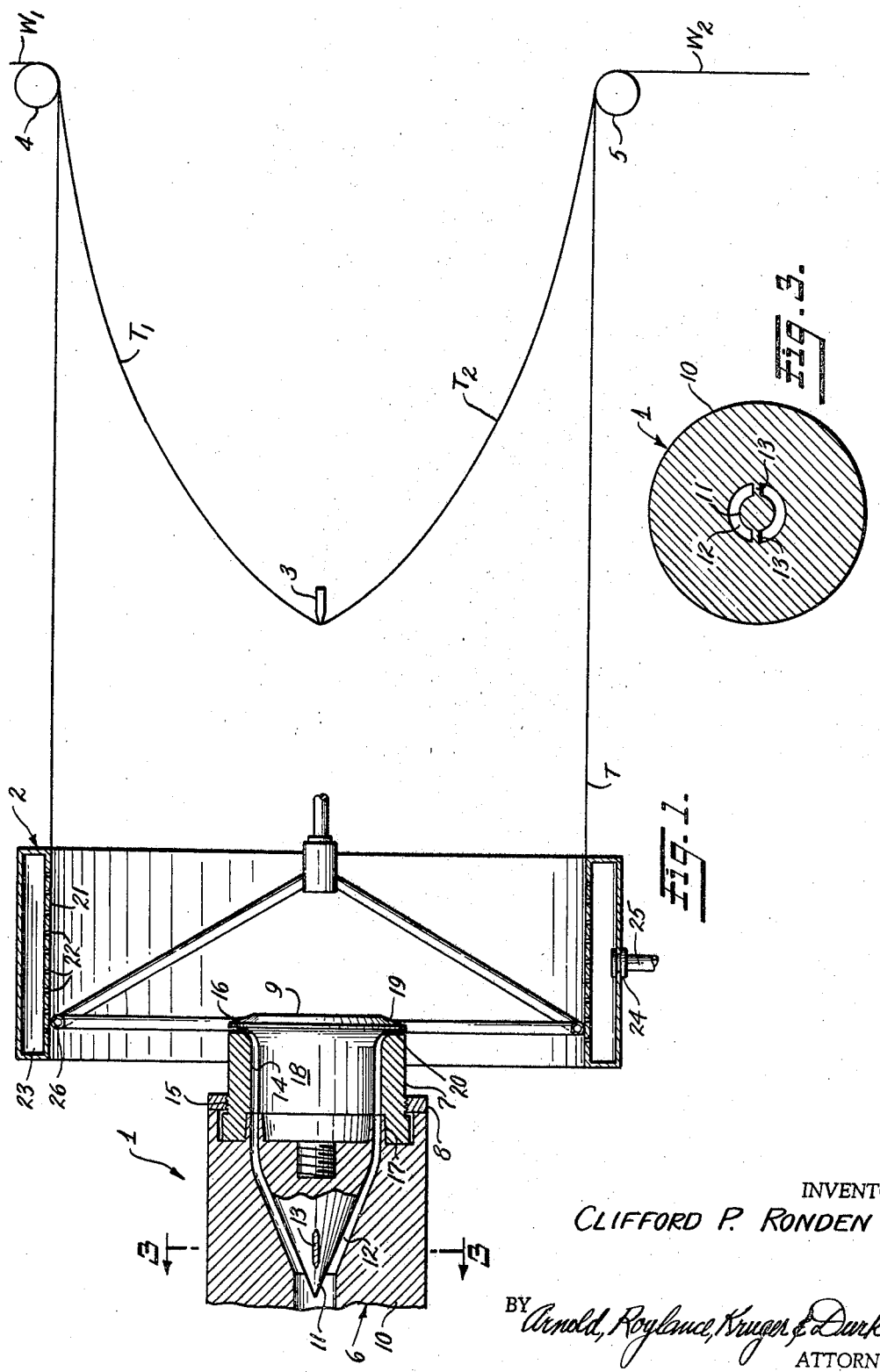

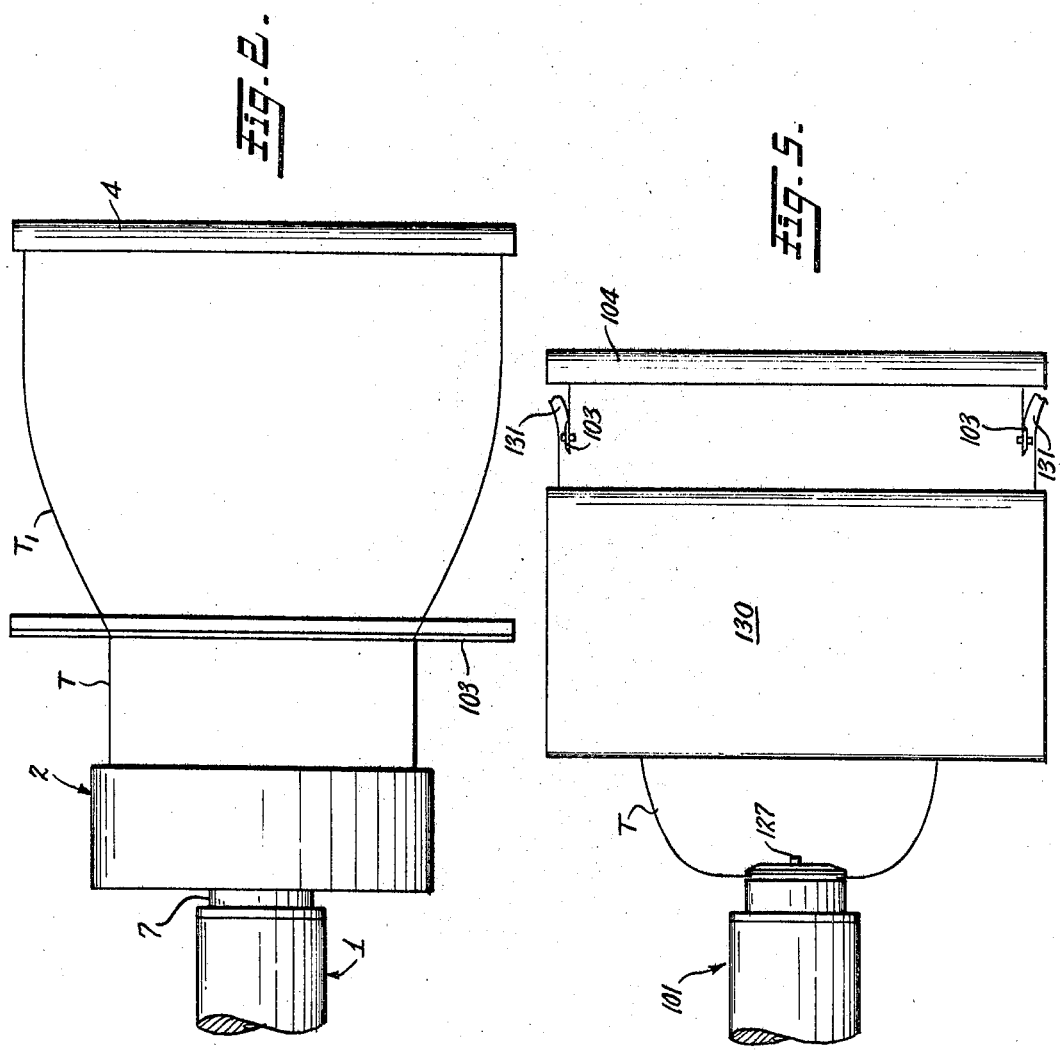

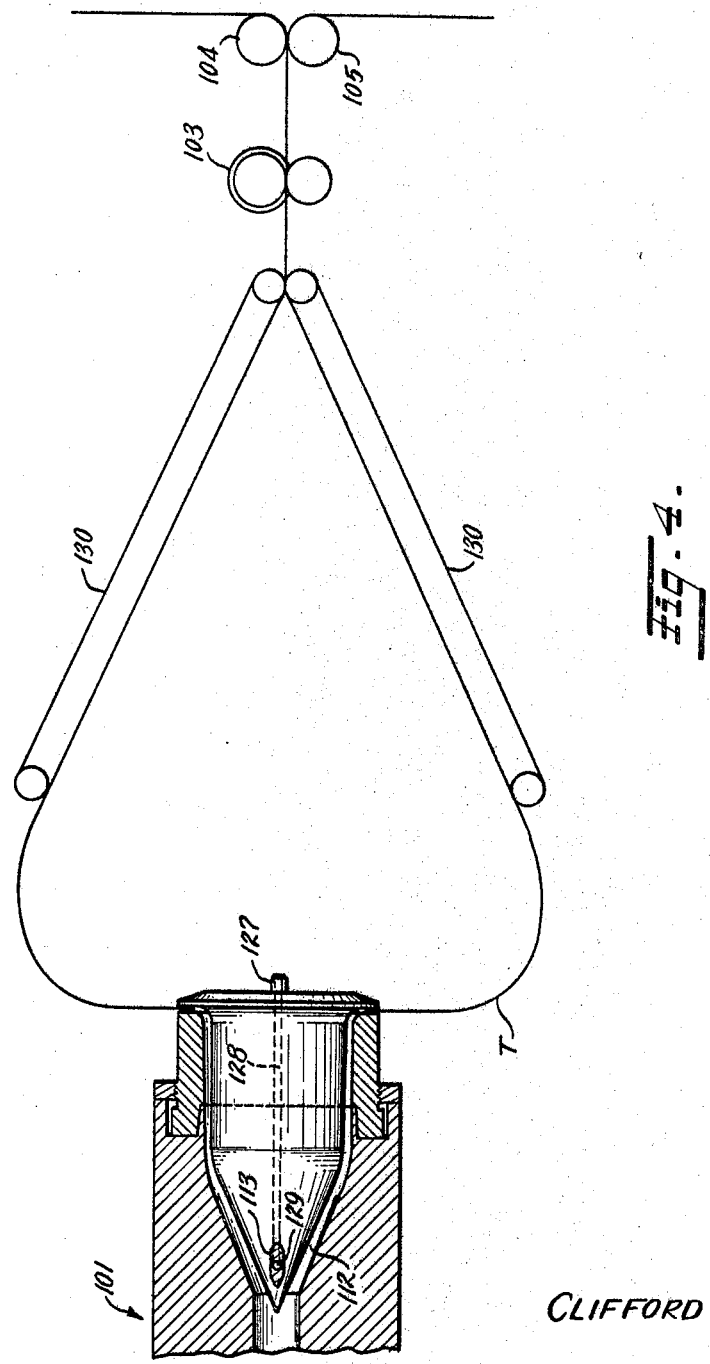

3,482,280
METHOD AND APPARATUS FOR PRODUCING POLYMERIC SHEET
Clifford P. Ronden, Edmonton, Alberta, Canada, assignor to Cupples Container Company, Austin, Tex., a corporation of Missouri
Filed Mar. 16, 1967, Ser. No. 623,642
Int. Cl. B29d 23/04
U.S. Cl. 18—14    3 Claims

ABSTRACT OF THE DISCLOSURE

A method and apparatus for producing extruded thermoplastic sheet which is free of discontinuities or weld lines that includes forcing a heat plastified mass through a tubular passage interconnected by two spider arms, conducting the material through an annular extrusion orifice to form a tubular product and thereafter axially severing the product along the weld lines, resulting from the presence of the two spider arms, into two webs or sheets. The apparatus that may be employed for carrying out the method includes two spider arms which are disposed in definite positions which are radial with respect to the tubular die passage leading to the orifice and have a predetermined relation to the cutting or trimming device by which the extruded tubular produce is severed to form two flat running sheets or webs.

---

This invention relates to the production of polymeric sheet and, more particularly, to an improved method and apparatus for producing sheet from polystyrene and similar thermoplastic materials.

Prior-art workers have proposed to produce sheet from polystyrene and like thermoplastic polymeric materials by continuously extruding the heat plastified polymeric material through an annular die orifice to form a tubular product which is still plastic as it emerges from the die, inflating the tubular product to a large diameter and then severing the tubular product longitudinally so that it can be converted to at least one flat web. Though such procedures are successful in a general sense, several problems have arisen, particularly when dealing with foamed polymeric sheet intended for conversion into containers and like products by thermoforming. For this purpose, it is necessary that the sheet be uniform throughout the full extent thereof which is to be subjected to thermoforming, and achieving adequate uniformity has proved difficult.

I have observed that sheet produced in the aforementioned manner has exhibited continuous lines extending in the direction of extrusion, and that these lines, representing discontinuities in the extruded material, correspond in number to the spider arms of the die, i.e., the radial arms interconnecting the inner "torpedo" and the next adjacent surrounding member of the die structure. In this connection, it is to be noted that, in extruding thermoplastic polymeric materials, and particularly foamable polystyrene, the temperature of the polymeric material as it passes the spider arms is maintained in a range below that at which fully viscous flow occurs. Hence, though the heat-plastified material recombines into a unified mass in the tubular passage of the die downstream from the spider arms, a longitudinally extending weld line occurs as a result of presence of each spider arm, and these weld lines persist as permanent discontinuities in the finished product. Such discontinuities cause areas of weakness in the sheet which are frequently not tolerable if the sheet is to be thermoformed or subjected to other rigorous processing or handling steps.

It is accordingly a general object of the invention to provide a method and apparatus for producing polymeric sheet free from the discontinuities which have heretofore resulted because of presence of the spider arms in the extrusion die.

Another object is to devise an improved system for producing uniform, extruded, foamed sheet from polystyrene and similar thermoplastic materials.

Stated generally, the invention employs an extrusion die employing two spider arms disposed in definite positions which are radial with respect to the tubular die passage leading to the extrusion orifice and which have a predetermined relation to the cutting or trimming device or devices by which the inflated tubular extruded product is severed preparatory to conversion to flat running webs, the arrangement being such that severing of the tubular product occurs substantially at or along the weld lines resulting from presence of the spider arms. In a preferred embodiment of the invention, the two spider arms are aligned diametrically across the die passage and the inflated tubular extruded product is flattened in a plane parallel to the spider arm, so that the two weld lines extend along the respective edges of the flattened tube, and the edge portions are trimmed away continuously as scrap and thus completely eliminated from the two flat webs which result as the final product.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a semi-diagrammatic view of one apparatus embodiment of the invention by which the method can be carried out;

FIG. 2 is a view similar to FIG. 1 but viewed from a point displaced 90° relative to FIG. 1;

FIG. 3 is a transverse cross-sectional view of the extrusion die of the apparatus of FIGS. 1 and 2, taken on line 3—3, FIG. 2; and FIGS. 4 and 5 are views respectively similar to FIGS. 1 and 2 and illustrating apparatus in accordance with another embodiment of the invention.

Turning now to FIGS. 1–3 in detail, the apparatus here illustrated comprises an extrusion die 1, a vacuum sizing ring 2, a slitting knife 3, and take-off rolls 4 and 5.

Die 1 is advantageously of the peripheral orifice type described in my copending application Serial No. 582,946, filed September 29, 1966, and includes a torpedo body 6, an annular die body 7, a supporting ring 8 for body 7, and a mandrel 9. Torpedo body 6 comprises an outer tubular portion 10 and an inner torpedo portion 11 which coact to define a tubular passage 12 and are interconnected by two spider arms 13 aligned with each other diametrically across the passage 12, the two spider arms 13 constituting the only interruptions in passage 12, as will be apparent from FIG. 3. Though the invention is in no way limited in this regard, die 1 can be considered as extending horizontally in such fashion that the common plane of arms 13 is also horizontal.

The annular die body 7 is tubular, having an inner right cylindrical surface 14, a threaded right cylindrical outer surface portion 15 engaged with threads provided in a central circular opening in supporting ring 8, and a transverse annular flat end face 16 directed away from ring 8. Ring 8 is rigidly secured to the front end of outer portion 10 of body 6, and body 6 includes a forwardly projecting central tubular portion 17 extending into body 7 so that, in effect, the inner surface 14 of body 7 constitutes a forward extension of the inner surface of portion 10 of body 6.

Mandrel 9 comprises an elongated cylindrical body portion 18 which is threaded at its rear end for rigid attachment to the front end portion of inner torpedo portion 11 in such fashion that the outer surface of body portion 18 is concentric with and spaced inwardly from the inner surface 14 of body 7. At its front end, the mandrel includes a transversely enlarged nose portion 19 presenting a transverse annular surface 20 directed toward and spaced forwardly from end face 16, face 16 and surface 20 defining the outwardly opening orifice of the die as fully described in the aforementioned copending application Ser. No. 582,946.

Vacuum sizing ring 2 is in the form of a hollow annulus having a right cylindrical inner surface 21. Surface 21 is provided with a plurality of small apertures 22 distributed evenly over the entire cylindrical surface. The interior space 23 is evacuated via a connector 24 and conduit 25, the latter being connected to a suitable source of vacuum (not shown). Surface 21 is covered over its entire area by a film of polytetrafluoroethylene or equivalent low-friction material. The sizing ring is mounted, in any suitable fashion, so as to be concentric with the die orifice, the rear end portion of surface 21 being disposed outwardly of the die orifice.

When extrusion is commenced, the extruded product initially emerges from the die orifice as a sheet extending in the plane of the orifice. The extruded product is manipulated manually into tubular form, and the tubular product T is drawn forwardly over surface 21.

A single slitting knife 3 is mounted in a position spaced from the front end of the sizing ring, the cutting edge of the knife being directed toward the sizing ring. Knife 3 is so positioned that it extends diametrically with respect to surface 21 of the sizing ring, with the cutting edges of the knife extending through those two diametrically spaced points through which the weld lines resulting from spider arms 13 must pass. Still manipulated manually for start-up, the tubular product T is drawn forwardly from the sizing ring and past knife 3, so that the tubular product is slit and thus formed into the two halves $T_1$ and $T_2$. Portion $T_1$ is run in tension over roller 4, being unfurled to form the flat web $W_1$ in the process, and the flat web is then run continuously to such further processing equipment (not shown) as may be involved. Similarly, portion $T_2$ is run in tension over roller 5 being unfurled to form flat web $W_2$, which can be run to other processing equipment (not shown) or to storage, as desired.

As the sheet which constitutes the initial extruded product emerges from the die orifice, the weld lines resulting because of presence of spider arms 13 extend radially outwardly in opposite direction from the die. When, after manual start-up, the tubular product T is drawn forwardly through sizing ring 2, the weld lines run forwardly along paths which must conform to surface 21 and which can be adjusted during manual start-up to run through respective points occupied by the cutting edge of knife 3. Hence, as operation of the apparatus continues after start-up, the effect of the knife is to cut the tubular product at least substantially along the weld lines. Accordingly, the weld lines can, at most, exist only at the extreme edges of the webs $W_1$ and $W_2$ and therefore are, for practical purposes, eliminated from the webs.

To achieve a stretching of the extruded sheet in a radial direction, relative to the longitudinal axis of the die, so as to attain biaxial orientation, the product is led over a circular guide ring 26 located outwardly of the peripheral mouth of the die orifice, the sheet then being held in sliding contact with surface 21 by the action of the sizing ring. The rate of haul off of the sheet through the combination of guide ring 26 and sizing ring 2 is dependent upon the speed of rotation of rolls 4 and 5 and is made such that the still-plastic extruded product adjacent the die orifice is stretched significantly.

In the apparatus embodiment shown in FIGS. 4 and 5, the extrusion die 101 is equipped with a forwardly directed air nozzle 127 to which air is supplied via an axial bore 128 and a radial bore 129 leading through one of the spider arms 113. The extruded product T is led forwardly between converging flattening belts 130, the forward ends of the belts 130 serving essentially to prevent the escape of air from within the now-tubular extruded product. The air discharged from nozzle 127 serves to inflate the tubular product, causing the still-plastic material adjacent the die orifice to be stretched radially so as to establish biaxial orientation.

Two circular slitting knives 103 are spaced transversely across the path of travel of the flattened web just downstream from the belts 130 and are each so positioned as to trim the edge portion 131 away from the flattened tubular product, thus converting the same into two independent flat webs, one of which is passed over roll 104 and the other of which is passed over roll 105.

The flattening belts 130 are so positioned that their converging ends engage the flattened tubular product substantially in a plane containing the two spider arms 113 of die 101. Accordingly, with the tubular product free of any significant twist, the edge portions 131 which are trimmed away by knives 103 are certain to contain the weld lines resulting because of the spider arms. It is to be noted that, since the radial bore 129 extends through one of the spider arms 113, there is no separate air supply pipe extending across die passage 112 to cause an additional weld line in the extruded product.

The method can be carried out typically by using as the starting material polystyrene particles containing 7% by weight of petroleum ether, as a blowing agent, and 0.2% by weight of citric acid, these particles being uniformly blended initially with sodium bicarbonate amounting to 0.25% by weight. Using this starting material, the extrusion die can be operated with a temperature in passage 12, 112 at the spider arms of 110–140° C., and a head pressure of 500–2000 pounds per square inch, depending upon the particular temperature employed. Assuming that the diameter of the die orifice is 5¼″, and that the diameter of the tubular product is 36″, production rates typically on the order of 30–48 feet per minute are attained.

The invention is applicable to all thermoplastic polymeric materials capable of being foamed by the thermally induced action of a blowing agent at temperatures in the softening range of the polymeric material, such polymeric materials including the normally solid vinyl aromatic polymers, such as polystyrene, polyvinyl chloride, polyvinylidene chloride, alkyl substituted polystyrenes, and copolymers of styrene with other vinyl monomers; the high molecular weight polymers of ethylenically unsaturated aliphatic monomers, particularly polyethylene and polypropylene; the polymers of halogenated ethylenically unsaturated aliphatic monomers, particularly polytetrafluorethylene; and the nylons.

When used herein, the term "sheet" is intended to include films of a thickness less than 0.010 in. as well as thicker sheet material of a thickness above 0.010 in.

In addition to the aforementioned application Ser. No. 582,946, attention is called to copending application Ser. No. 623,643, filed concurrently herewith.

What is claimed is:

1. Apparatus for producing thermoplastic polymeric sheet which is especially suitable for thermoforming, comprising in combination:

extruding means including two concentric members defining a tubular passage terminating in an annular extrusion orifice, said extruding means including two spider arms extending across said tubular passage and rigidly interconnecting said concentric members, said spider arms being aligned with each other diametrically of said passage and said passage being open and uninterrupted save for said spider arms, heat plastified polymeric material supplied under pressure to said passage flowing around said spider arms and recombining into an annular mass in said passage downstream from said spider arms with the annular mass containing two persisting weld lines resulting respectively from presence of said spider arms;

means for carrying the extruded product continuously away from said orifice in tubular form; and severing means operative to axially sever the tubular product continuously as the product is carried away, said severing means being so constructed and positioned relative to said extruding means as to sever the tubular product substantially along the weld lines caused by said spider arms and thereby convert the tubular product into two separate continuous webs each free from weld lines.

2. Apparatus according to claim 1 and further comprising:

flattening means spaced from said orifice and arranged to flatten the tubular product as the same is carried away from said orifice, said flattening means being so positioned relative to said extruding means that said weld lines each extend along a different edge of the flattened tubular product, said severing means including two trimming devices spaced from said flattening means in the direction of movement of the flattened tubular product and each disposed to continuously trim away a different edge portion of the flattened tubular product, whereby said weld lines are eliminated.

3. Apparatus according to claim 1, wherein:

said severing means includes slitting means disposed to slit the tubular product at the two diametrically spaced points through which the weld lines caused by said spider arms travel as the tubular product is carried away from extruding means.

References Cited

UNITED STATES PATENTS

| | | |
|---|---|---|
| 1,248,962 | 12/1917 | Weber. |
| 2,607,078 | 8/1952 | Grimes. |
| 3,160,917 | 12/1964 | Berggren et al. |
| 3,160,918 | 12/1964 | Berggren et al. |

WILLIAM J. STEPHENSON, Primary Examiner